United States Patent
Loce et al.

(10) Patent No.: US 8,115,795 B2
(45) Date of Patent: Feb. 14, 2012

(54) TWO-DIMENSIONAL ROS EMITTER GEOMETRY WITH LOW BANDING SENSITIVITY

(75) Inventors: Robert P. Loce, Webster, NY (US); Beilei Xu, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 330 days.

(21) Appl. No.: 12/473,819

(22) Filed: May 28, 2009

(65) Prior Publication Data
US 2010/0302341 A1    Dec. 2, 2010

(51) Int. Cl.
*B41J 27/00*    (2006.01)

(52) U.S. Cl. .................................... 347/261

(58) Field of Classification Search .............. 347/229, 347/231, 233, 234, 243, 248, 259, 260
See application file for complete search history.

(56) References Cited

U.S. PATENT DOCUMENTS

| | | |
|---|---|---|
| 3,520,586 A | 7/1970 | Bousky |
| 3,635,545 A | 1/1972 | Von Kerhove et al. |
| 3,734,609 A | 5/1973 | Tonaka et al. |
| 3,781,464 A | 12/1973 | Bousky |
| 4,089,008 A | 5/1978 | Suga et al. |
| 4,097,115 A | 6/1978 | Garwin et al. |
| 4,253,102 A | 2/1981 | Kataoka et al. |
| 4,445,126 A | 4/1984 | Tsukada |
| 4,547,038 A | 10/1985 | Mori |
| 4,566,043 A | 1/1986 | Tamura |
| 4,637,679 A | 1/1987 | Funato |
| 4,788,560 A | 11/1988 | Miura |
| 4,796,964 A | 1/1989 | Connell et al. |
| 4,797,694 A | 1/1989 | Agostinelli et al. |
| 4,801,950 A | 1/1989 | Frehling |
| 4,989,019 A | 1/1991 | Loce et al. |
| 5,119,113 A | 6/1992 | Prakash et al. |
| 5,233,367 A | 8/1993 | Curry |
| 5,305,022 A * | 4/1994 | Ota et al. ................ 347/233 |
| 6,972,783 B2 * | 12/2005 | Takamatsu et al. ........ 347/233 |
| 7,956,882 B2 * | 6/2011 | Nakajima ................ 347/234 |
| 2003/0086142 A1 * | 5/2003 | Akatsu et al. ............ 359/204 |
| 2008/0204842 A1 | 8/2008 | Arai et al. |
| 2008/0212999 A1 * | 9/2008 | Masuda et al. ............ 399/158 |

FOREIGN PATENT DOCUMENTS

GB    2069176 A    8/1981

OTHER PUBLICATIONS

Arimoto, A., et al., Dual Beam Laser Diode Scanning Systems, Applied Optics, Jul. 1987, vol. 26, No. 13.

* cited by examiner

*Primary Examiner* — Hai C Pham
(74) *Attorney, Agent, or Firm* — Fay Sharpe LLP (57) ABSTRACT

An optical scanning device projects an image onto a photoreceptor within a print system. A laser light source generates a plurality of light beam outputs, wherein the light beam outputs are arranged in a two-dimensional parallelogram array within a substantially horizontal axis and a substantially vertical axis that is perpendicular to the horizontal axis. The two-dimensional parallelogram array has an odd number of rows of light beam outputs, wherein each row has an equal even number of light beam outputs. A rotating polygon mirror includes a plurality of deflecting surfaces, each of the deflecting surfaces deflects the light beams emitted from the laser light source. The light beam output array projects a first swath N onto the photoreceptor via the rotating mirror and swaths [N+1, N+2, . . . ] are subsequently placed at a level one-half down the number of light beam outputs of the previous swath. Each swath has the identical number of light emitting outputs as the two-dimensional array.

20 Claims, 9 Drawing Sheets

TWO-DIMENSIONAL ROS EMITTER GEOMETRY WITH LOW BANDING SENSITIVITY

BACKGROUND

The present exemplary embodiments relate generally to raster output scanners. In one particular application, raster output scanner sensitivity to banding is mitigated by reducing sensitivity of error caused by emitter rotation. It is to be appreciated, however, that the present exemplary embodiment is also amenable to other like applications.

A conventional multi-beam raster output scanner (ROS) has a reflective multifaceted polygon mirror that is rotated about its central axis. The polygon mirror repeatedly sweeps beams of light emitted from a modulating laser light source across a photoreceptor. The photoreceptor can be on a drum that rotates about an axis or on a belt that rotates along a closed path on rollers. In either case, the beams move in a line scanning direction while the recording medium advances in an orthogonal (process) direction. The beams scan the recording medium in accordance with a raster scanning pattern. Digital printing is performed by serially intensity modulating each of the beams in accordance with a picture element (pixel) data stream. Thus, the photoreceptor is exposed to form the image represented by the pixel data.

The use of the rotating polygon mirror optical system, however, presents several inherent problems. Bow and wobble of the beam scanning across the surface of the photoreceptor can result from imperfections in the optics, the mirror and/or mechanical defects that cause instability in the rotation of the polygon mirror. These problems typically require complex, precise and expensive optical elements between the light source and the rotating polygon mirror and the surface of the photoreceptor. Optically complex elements are also needed to compensate for refractive index variation, wherein the refractive index varies for different portions of the optics that image to different points on the photoreceptor. If the focus is different, the writing spot can be a different size or displaced from an intended position that causes changes in the focal length of the imaging optics of the ROS.

In some embodiments, the modulating laser light source consists of a vertical cavity surface emitting laser (VCSEL) array. The VCSEL array may be either a one- or two-dimensional array of individual laser sources. Each individual laser source in the VCSEL array has a corresponding drive circuit which may be used to generate a beam to expose a corresponding area on the surface of the photoreceptor in response to video data information applied to the drive circuits of the VCSEL array. The photoreceptor is advanced in the process direction to provide a desired image by the formation of sequential scan lines generated by the beam-to-beam exposure delivered from the VCSEL array. As utilized herein, an array with a vertical orientation has a greater number of rows than columns of light emitters. In contrast, an array with a horizontal orientation has an equal or lower number of rows than columns of light emitters.

The chief deficiency of a high resolution VCSEL Raster Output Scanner is the sensitivity of banding to very small amounts of emitter array rotation. While overwriting can suppress some types of banding, it does not suppress banding due to emitter array rotation error for conventional emitter geometry. This lack of suppression occurs because overwriting writes the rotation exposure error of one pass exactly on the rotation exposure error of the previous pass. Hence, the exposure error is not reduced by averaging over two exposures. Additionally, current error correction methods write row-to-row seams on swath-to-swath seams, thereby increasing the amplitude of banding due to those interacting seams.

Figure 1:
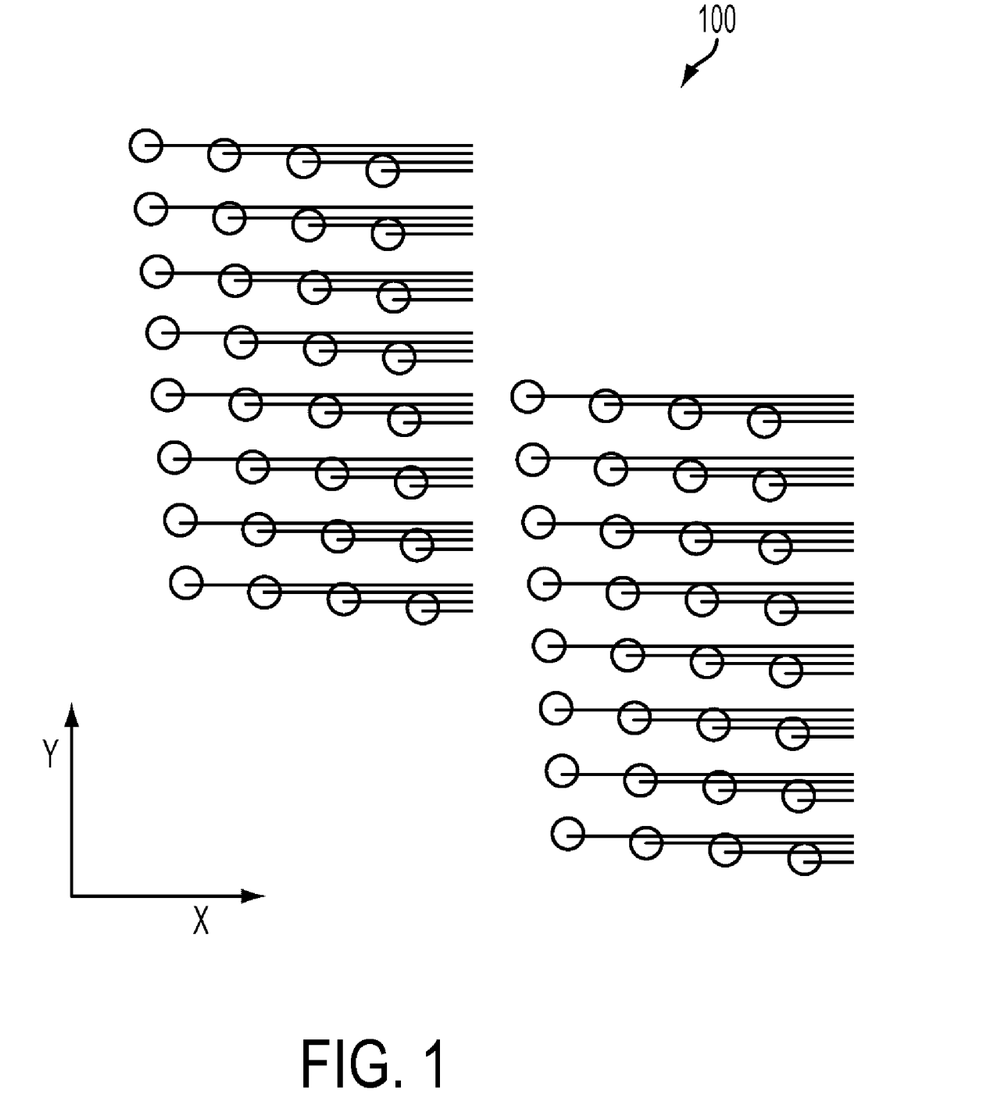
FIG. 1 illustrates rotation error of an array of in a vertical orientation, in accordance with an exemplary embodiment.

FIG. 1 provides an example of the rotation error using an array 100 in a vertical orientation, which contains thirty-two light emitters arranged in four columns and eight rows. Accordingly, the array 100 is a vertical orientation, as it has a greater number of rows than columns. In this example, the array has a slight counterclockwise rotation error that leads to a raster spacing error, wherein the spacing of the rasters between the rows is greater than the spacing within the rows. Also, the seam between successive swaths can be seen to lie on the seam between rows, which can further exacerbate the exposure errors.

Figure 2:
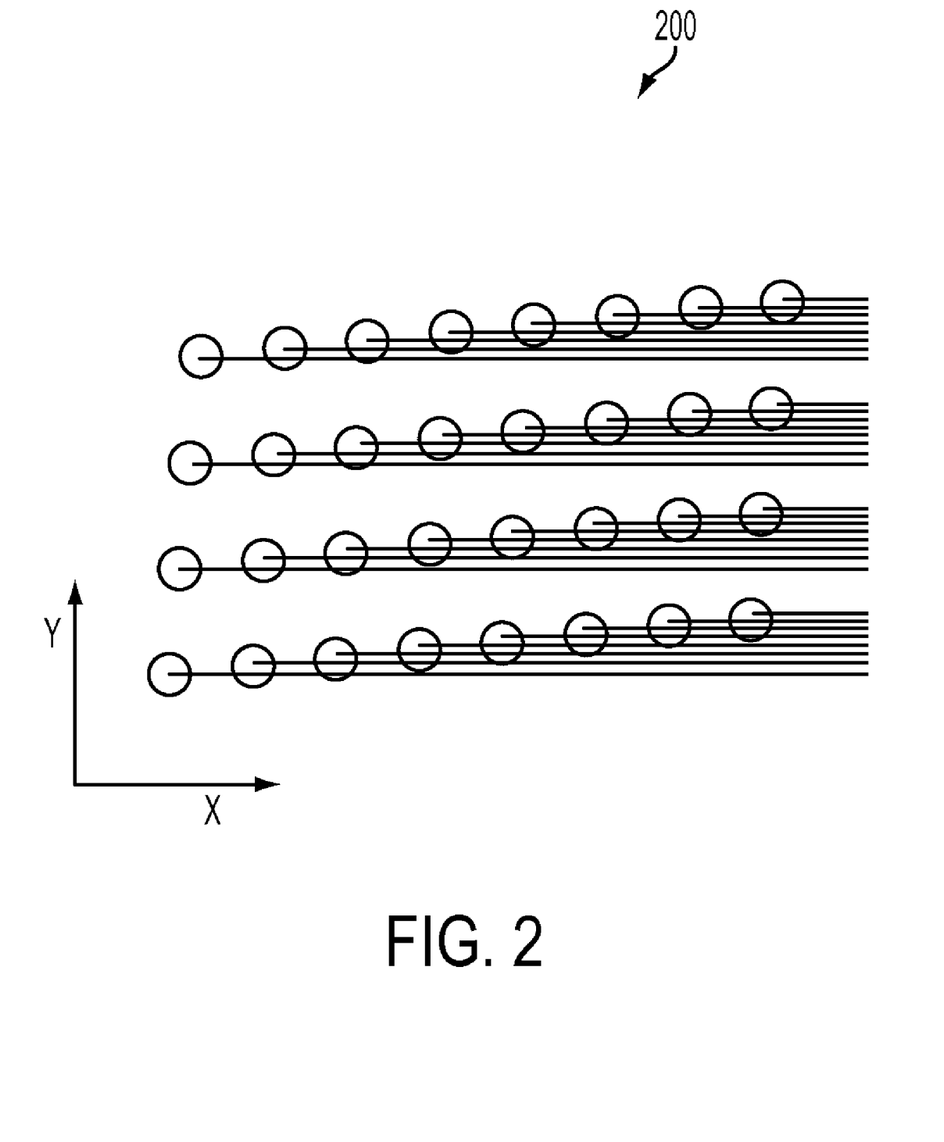
FIG. 2 illustrates rotation error of an array in a horizontal orientation, in accordance with an exemplary embodiment.

FIG. 2 illustrates rotation error caused for an array 200 with a horizontal orientation. In this embodiment, the array 200 is rotated ninety degrees from the array 100 to enable greater optical efficiency needed for high speed image-on-image products. The horizontal orientation, however, is more sensitive to banding because the row length is longer (e.g., by a factor of 2-3) and the frequency of the rotation error is halved over the first geometry 100. Accordingly, what are needed are systems and methods to mitigate banding in raster output scanners regardless of VCSEL array orientation.

BRIEF SUMMARY OF THE INVENTION

In one aspect, an optical scanning device projects an image onto a photoreceptor within a print system. A laser light source generates a plurality of light beam outputs, wherein the light beam outputs are arranged in a two-dimensional parallelogram array within a substantially horizontal axis and a substantially vertical axis that is perpendicular to the horizontal axis. The two-dimensional parallelogram array has an odd number of rows of light beam outputs, wherein each row has an equal even number of light beam outputs. A rotating polygon mirror includes a plurality of deflecting surfaces, each of the deflecting surfaces deflects the light beams emitted from the laser light source. The light beam output array projects a first swath N onto the photoreceptor via the rotating mirror and swaths [N+1, N+2, . . . ] are subsequently placed at a level one-half down the number of light beam outputs of the previous swath. Each swath has the identical number of light emitting outputs as the two-dimensional array.

In another aspect, an optical scanning device projects an image onto a photoreceptor within a print system. A laser light source generates a plurality of light beam outputs, the light beam outputs are arranged in a two-dimensional parallelogram array within a substantially horizontal axis and a substantially vertical axis that is perpendicular to the horizontal axis. The two-dimensional parallelogram array has an odd number of rows of light beam outputs, wherein each row has an equal even number of light beam outputs. A rotating polygon mirror includes a plurality of deflecting surfaces, each of the deflecting surfaces deflects the light beams emitted from the laser light source. The light beam output array projects a first swath N onto the photoreceptor via the rotating mirror. Swaths [N+1, N+2, . . . ] are subsequently placed at a level one-half down the number of light beam outputs of the previous swath, wherein a seam is created when one swath is placed on another, row-to-row spacing error is not coincident with swath-to-swath seam error.

In yet another aspect, an optical scanning device projects an image onto a photoreceptor within a print system. A laser light source generates a plurality of light beam outputs, the light beam outputs are arranged in a two-dimensional parallelogram array within a substantially horizontal axis and a substantially vertical axis that is perpendicular to the horizontal axis. The two-dimensional parallelogram array has an odd number of rows of light beam outputs, wherein each row has an equal even number of light beam outputs. A rotating polygon mirror includes a plurality of deflecting surfaces, each of the deflecting surfaces deflects the light beams emitted from the laser light source. The light beam output array projects a first swath N onto the photoreceptor via the rotating mirror and swaths [N+1, N+2, ...] are subsequently placed at a level one-half down the number of light beam outputs of the previous swath. Row-to-row spacing error due to emitter rotation error is displaced in successive swaths, wherein the displacement is located such that the spacing error from one swath is at or near the center of a row of a subsequent swath.

DETAILED DESCRIPTION

Figure 3:
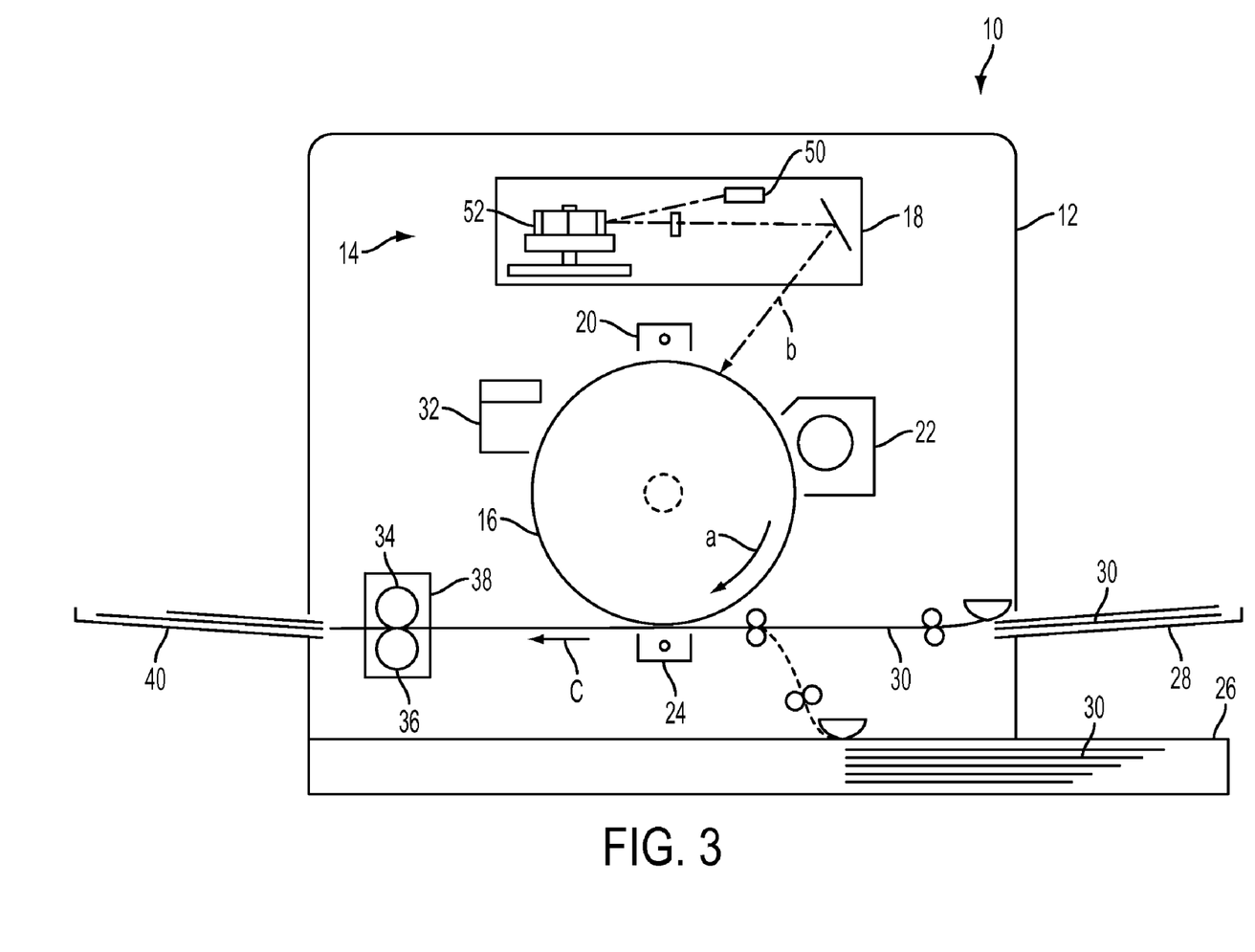
FIG. 3 shows an exemplary embodiment of a printer that utilizes a raster output scanning device, in accordance with an exemplary embodiment.

FIG. 3 is a diagram showing general structure of an image-forming apparatus 10 relating to an embodiment of the present disclosure. The image-forming apparatus 10 is covered by a casing 12. An image-forming section 14 is provided inside the casing 12. The image-forming section 14 is provided with a cylindrical photoreceptor 16 and an optical scanning device 18. The photoreceptor 16 rotates at a constant speed in the direction of arrow a. The optical scanning device 18 directs light beams based on desired image data toward the photoreceptor 16 (in the direction of arrow b in FIG. 3) while scanning.

A charging unit 20 is disposed in a peripheral surface vicinity of the photoreceptor 16. The charging unit 20 charges the photoreceptor 16 uniformly as a result of the photoreceptor 16 rotating in the direction of arrow a at a predetermined speed. The rotation of a polygon mirror 52 causes beams b to scan along a path that is parallel to the axis of the photoreceptor 16. The intensities of the beams are modulated in an imagewise fashion as they are scanned, selectively discharging the photoreceptor 16 and thereby creating a latent image on the photoreceptor 16.

A developing unit 22 which supplies toner to the photoreceptor 16 is disposed facing the peripheral surface of the photoreceptor 16, at a downstream side in the direction of rotation of the photoreceptor 16 from a position of irradiation by the light beam or beams from the optical scanning device 18. The toner supplied from the developing unit 22 adheres at portions which have been irradiated by the light beam from the optical scanning device 18. As a result, a toner image is formed on the peripheral surface of the photoreceptor 16.

A transfer charger 24 is disposed facing the peripheral surface of the photoreceptor 16, at a downstream side of the photoreceptor 16 in the direction of rotation of the photoreceptor 16 from the position at which the developing unit 22 is disposed (at a position vertically below an axial center of the photoreceptor 16). The transfer charger 24 transfers the toner image formed on the peripheral surface of the photoreceptor 16 to paper 30, which is guided between the photoreceptor 16 and the transfer charger 24 from a paper tray 26 or a manual feed tray 28.

A cleaner 32 is disposed facing the photoreceptor 16, at a downstream side in the rotation direction of the photoreceptor 16 from the position at which the transfer charger 24 is disposed. Toner remaining at the peripheral surface of the photoreceptor 16 after transfer is removed by the cleaner 32.

The paper 30 to which the toner image has been transferred is ejected in the direction of arrow c. A fixing unit 38, which is structured to include a pressure roller 34 and a heating roller 36, is disposed at a downstream side from the photoreceptor 16 in the direction of ejection of the paper 30. At the fixing unit 38, the paper 30 to which the toner image has been transferred and which is being ejected is subjected to pressure and heated, and the toner is fixed by melting. That is, a "fixing process" is performed at the fixing unit 38, and the predetermined image is recorded on the paper 30. The fixing process is achieved, and the paper 30 on which the image has been recorded is ejected to a discharge tray 40.

The optical scanning device 18 can be provided with an array-form semiconductor laser (below referred to as a "laser array") and a polygon mirror (a rotating multi-faced mirror). The polygon mirror can be formed in a regular polygonal shape and provided with a plurality of reflective surfaces at side faces thereof, and can be rotated at high speed by a motor (not shown). The laser array can be a VCSEL in which a plurality of light emitting spots are arranged in two dimensions. The VCSEL can include a multi-spot laser diode in which the plurality of light emitting spots are arranged in two dimensions.

In one arrangement, the multi-spot laser diode can have a total of twenty-eight light emitting spots disposed two-dimensionally with predetermined spacings, seven in a main scanning direction by four in a sub-scanning direction. In another arrangement, the multi-spot laser diode can have a total of twenty-four light emitting spots disposed two-dimensionally with predetermined spacings, six in one scanning direction by four in another scanning direction. These exemplary arrangements are for illustration purposes and are not intended to be limiting of the disclosure. Other optical scanner reductions to practice are well known to those skilled in the art. For example, the light emitting device 50 can be a single edge-emitting laser diode having a plurality of emitters on a single chip, or a plurality of diodes. The scanning function, shown implemented by a rotating polygon mirror 52, can also be implemented by an oscillating galvanometer or a micro-electro-mechanical system.

Figure 4:
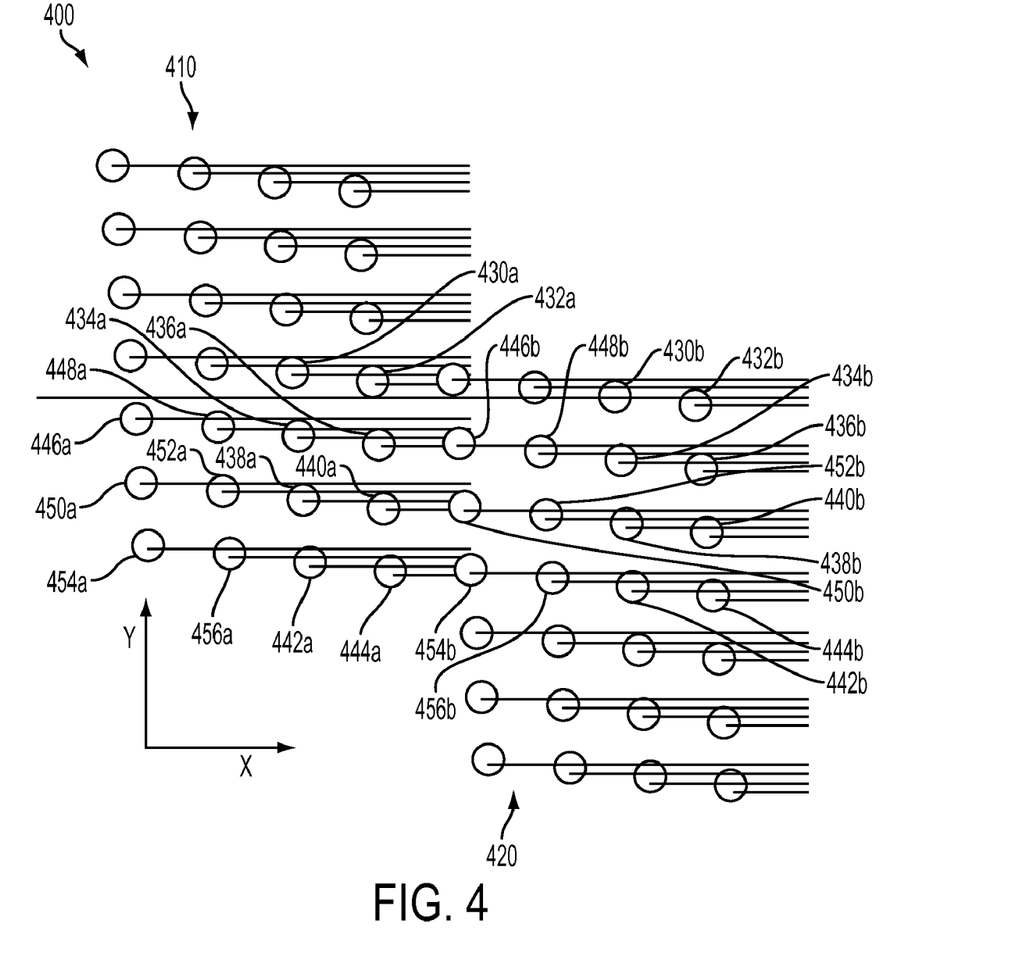
FIG. 4 illustrates an exemplary geometry of a light emitting array, in accordance with an exemplary embodiment.

FIG. 4 illustrates an array 400 that contains an exemplary geometry of light emitting sources. The array 400 can be employed with an imaging system within an electrophotographic printer to write in either an overwriting or interlaced writing method. In one approach, the array 400 projects a plurality of light beams onto a rotating mirror, which in turn projects the light onto a photoreceptor. As the mirror rotates, it projects multiple passes of light onto the photoreceptor, wherein a first pass projects a first swath 410 and a second pass projects a second swath 420 from the array 400. For sake of clarity, the first swath 410 and the second swath 420 are shown apart It is to be understood, however, that the second swath 420 is, in fact, partially overwritten onto to the first swath 410. This geometry avoids writing row-to-row seams on swath-to-swath seams, thereby lowering the amplitude of banding due to those interacting seams. Thus, error can be mitigated via the geometry of the light emitting array in place of correcting emitter array rotation error, which can be complex and costly.

The geometry of the array 400 includes twenty-eight emitters within seven rows wherein each row includes four emitters. Accordingly, in this embodiment, the array 400 is configured in a vertical orientation. The number of rows, however, can be substantially any odd number (e.g., 3, 5, 7, 9, 11, etc.). The number of emitters per row can be substantially any even number (e.g., 2, 4, 6, 8, 10, 12, etc.), wherein each row has the same number of emitters. In this manner, vertical orientation with the number rows can be maintained. An even number of emitters within a row also allows the seam from array rotation error for one swath to be as far away as possible from the array rotation error for an overwriting swath. Additionally, short rows (e.g., 2, 4, or 6 light emitters) can minimize the raster line displacement caused by rotation error of the emitter array.

This example shows one level of overwriting, wherein a first swath 410 is written and followed by a writing of a second swath 420. The second swath 420 is written at a location that is down half the number of light emitting sources of the first swath 410 at an anchor point 430a, which is three and a half rows (14 emitters) in this example. More particularly, points 430a, 432a, 434a, 436a, 438a, 440a, 442a, 444a, 446a, 448a, 450a, 452a, 454a and 456a of the first swath 410 are overwritten by corresponding points 430b, 432b, 434b, 436b, 438b, 440b, 442b, 444b, 446b, 448b, 450b, 452b, 454b and 456b of the second swath 420. The seam from rotation error of the first swath 410 is written in the middle of a row of the second swath 420. Thus, the exposure error is reduced in amplitude wherein the swath-to-swath seam is not coincident with rotation error of the array, thereby preventing an increase in amplitude due to an interaction. Further, the remaining exposure error is doubled in frequency making it less visible and less likely to beat with a halftone.

The odd number of equal length row array configuration can also be utilized to write on a photoreceptor via interlace writing. As the photoreceptor moves and the mirror rotates through a single facet, the light emitting array 400 will lay down multiple scans in accordance with an interlace algorithm. Successive facets of the mirror will position scans between or on top of those already laid down until the light emitting array 400 has passed due to the motion of the photoreceptor. In one example, writing with 27 beams, interlace 2 (odd number of rows: 6 rows of 4, 1 row of 3), provides better rotation seam averaging than writing with 31 beams, interlace 2 (even number of rows: 7 rows of 4, 1 row of 3).

Figure 5:
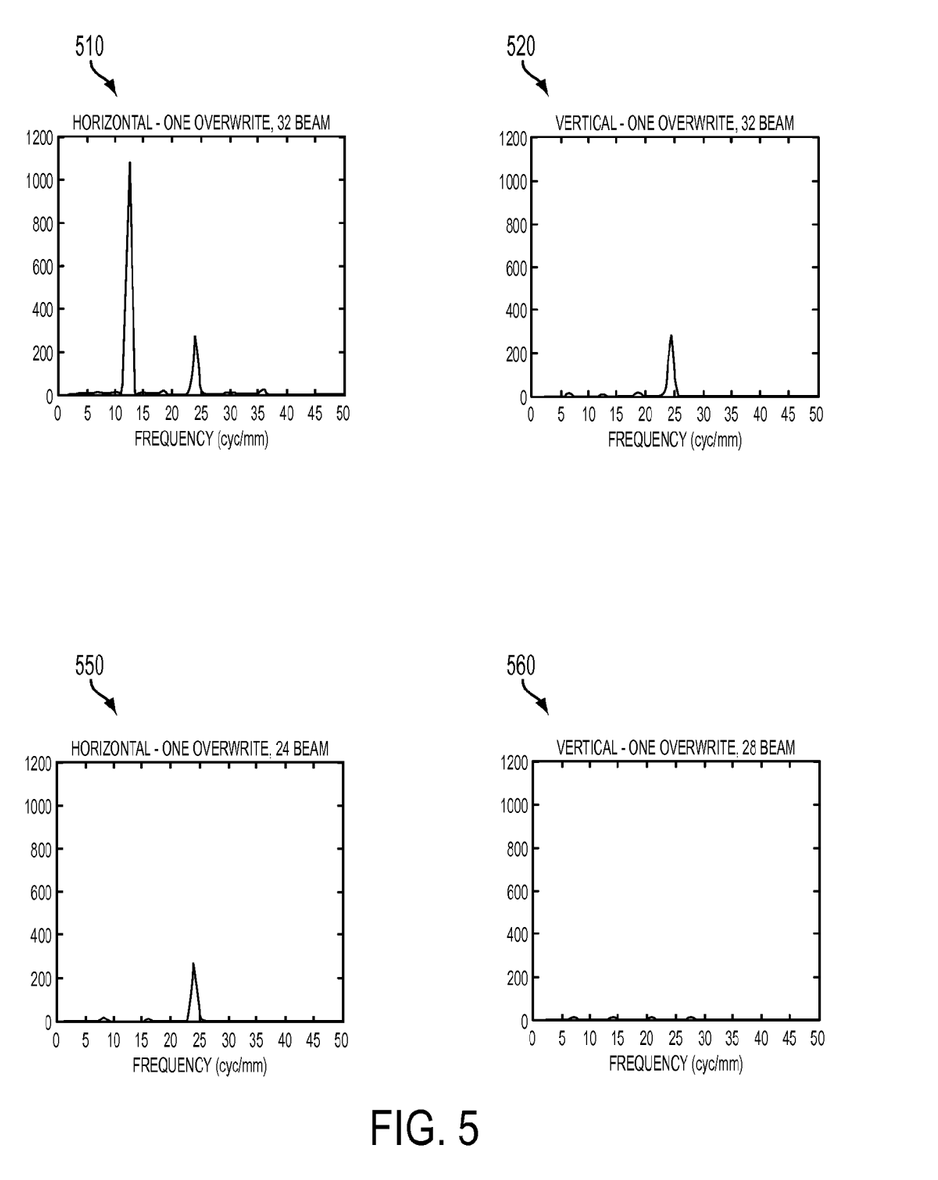
FIG. 5 shows graphs that illustrate components across frequency spectra of the exposure resulting from a 0.4° array rotation error, in accordance with an exemplary embodiment.

The present invention has been simulated for types of errors: array rotation, magnification, and beam-to-beam non-uniformity. The results, shown in FIGS. 5-9, illustrate a decrease in array rotation sensitivity with no additional sensitivity to magnification or beam-to-beam non-uniformity. FIG. 5 illustrates four graphs 510, 520, 550 and 560 that illustrate components across frequency spectra for exposure resulting from a 0.40 array rotation error. The graphs 510 and 550 illustrate a horizontal orientation whereas the graphs 520 and 560 illustrate a vertical orientation. Further, the graphs 510 and 540 shows an even number of rows and the graphs 550 and 560 show an odd number of rows. Each of the graphs 510, 520, 550 and 560 illustrate error in terms of exposure amplitude in the Y-axis and spatial frequency (cycles per millimeter) in the X-axis.

The graph 510 shows three distinct components at approximately 12 cycles per millimeter, approximately 24 cycles per millimeter and approximately 36 cycles per millimeter. The amplitude of the 12 cycles per millimeter component is approximately 1100 exposure units, the component at 24 cycles per millimeter is approximately 300 exposure units and the component at 36 cycles per millimeter is approximately 40 exposure units. In contrast, the graph 520 illustrates one distinct error component at approximately 24 cycles per millimeter with an amplitude of approximately 300 exposure units. Accordingly, utilizing a vertical orientation shows a reduction in number and amplitude of components for a 0.4° array rotation error.

The graph 550 illustrates a horizontal orientation as shown in the graph 510. The difference between 550 and 510, however, is that the number of rows in 550 is odd. The error is reduced to a single component at approximately 24 cycles per millimeter with an amplitude of approximately 300 exposure units. Accordingly, utilizing a horizontal orientation with an odd number of rows provides a drastic reduction in the number of error components compared to an even number of rows. The graph 560 illustrates that this error can be completely eliminated when using a vertical orientation with an odd number of rows. As shown, there is no significant error component within the frequency spectra for 0.4° rotation error of the emitter array.

Figure 6:
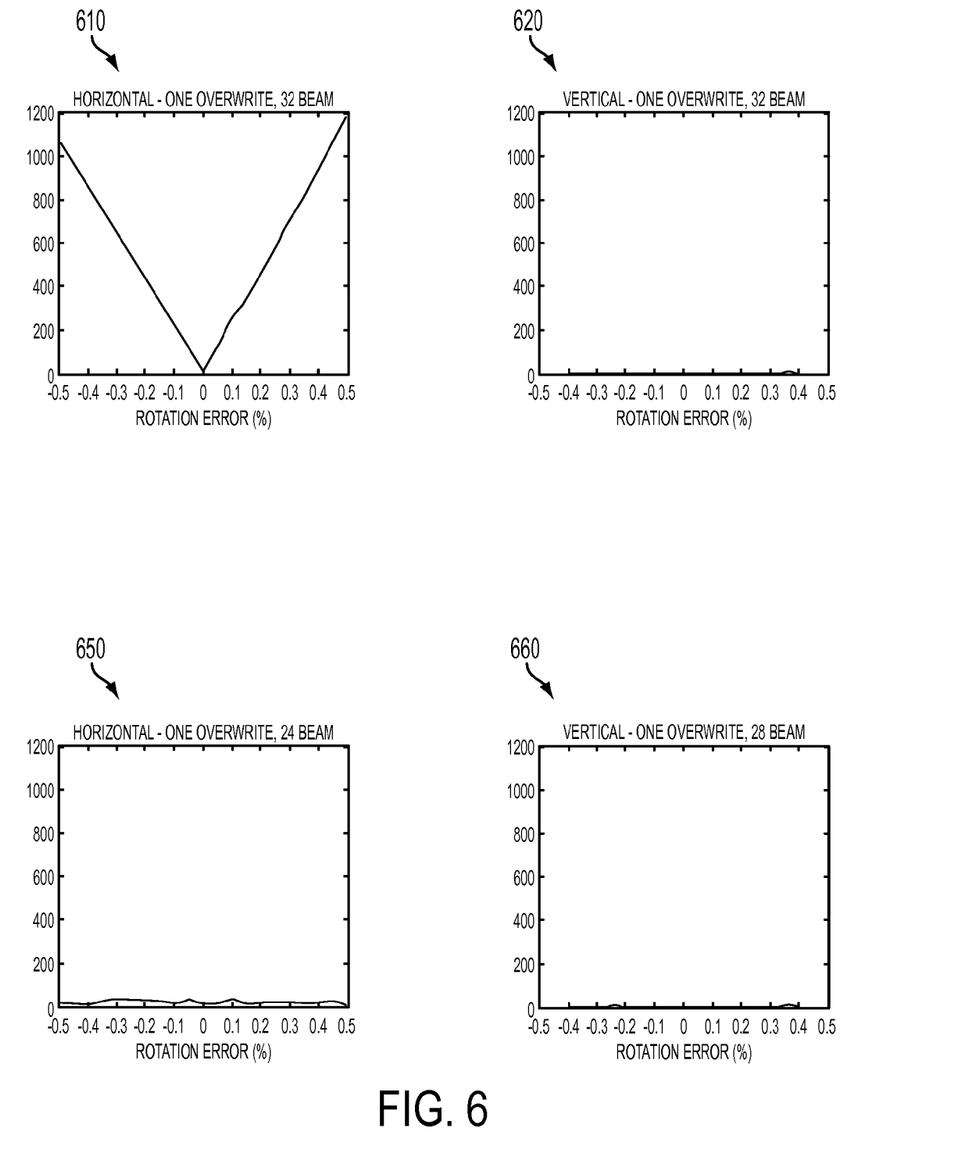
FIG. 6 illustrates graphs that show amplitude in the Y-axis and rotation error in the X-axis for an exposure of error of 12 cycles per millimeter, in accordance with an exemplary embodiment.

FIG. 6 illustrates four graphs 610, 620, 650 and 660 for an exposure of error at 12 cycles per millimeter. The Y-axis provides the amplitude of error in exposure units and the X-axis is the emitter array rotation error in degrees. Similar to FIG. 5, the graphs 610 and 650 illustrate a horizontal orientation and the graphs 620 and 660 illustrate a vertical orientation. Further, the graphs 610 and 620 illustrate an even number of rows within the geometry and the graphs 650 and 660 illustrate an odd number of rows within the geometry.

The graph 610 shows a V-shaped exposure error amplitude that is approximately 0 exposure units at 0° rotation error and increases linearly to about 1100 exposure units for a negative 0.5° rotation error and about 1200 exposure units for a plus 0.5° rotation error. The graph 620 illustrates that there is substantially zero exposure error when utilizing a vertical orientation with an even number of rows. The graph 650 shows a slight error increase when utilizing a horizontal rectangle geometry with an odd number of rows. The graph 660 illustrates a zero exposure error when utilizing a vertical rectangle geometry with an odd number of rows. Accordingly, utilizing the vertical orientation provides the least amount of error regardless of row number with exposure error at 12 cycles per millimeter.

Figure 7:
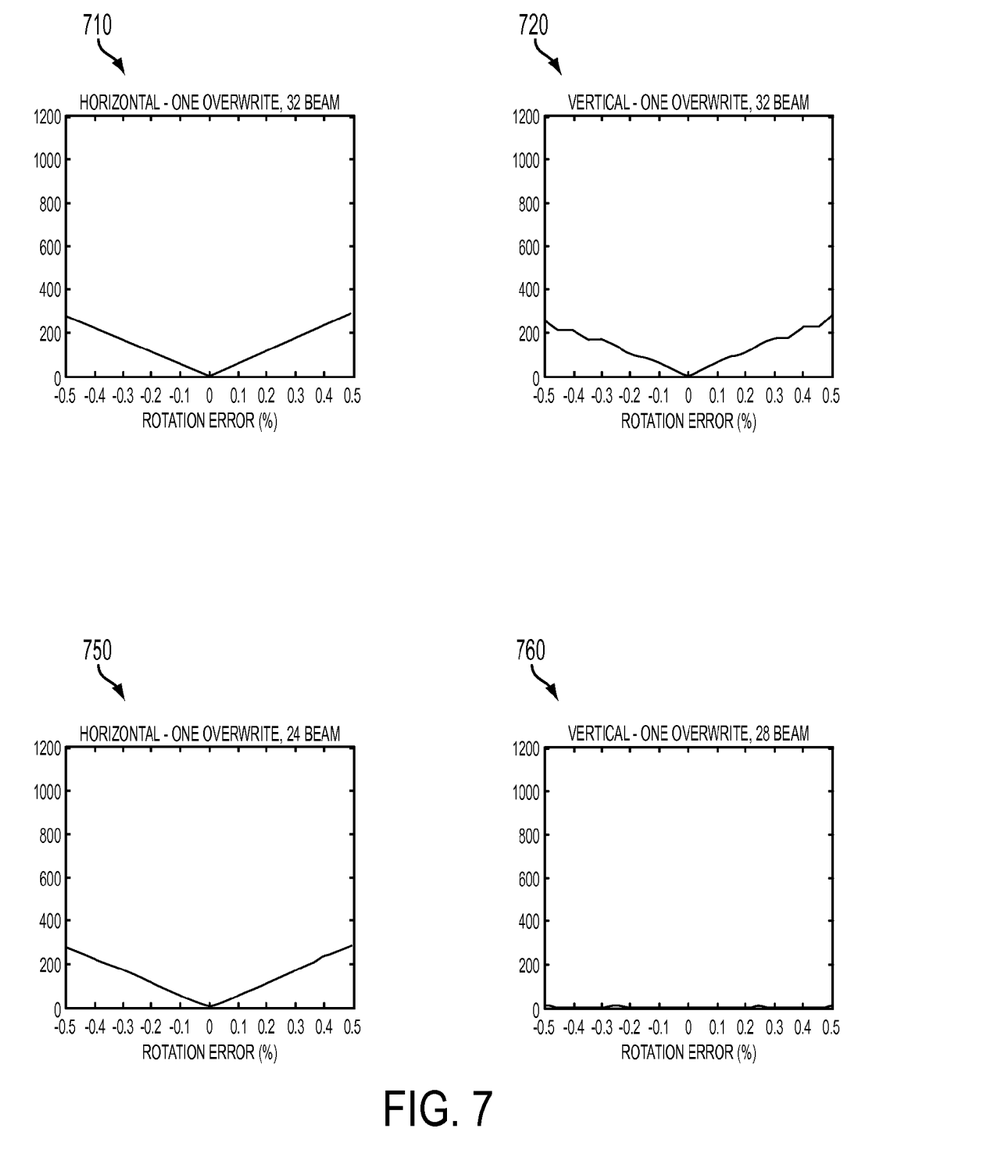
FIG. 7 illustrates graphs that show amplitude in the Y-axis and rotation error in the X-axis for an exposure error of 24 cycles per millimeter, in accordance with an exemplary embodiment.

FIG. 7 illustrates four graphs 710, 720, 750 and 760 that show exposure amplitude in the Y-axis and emitter array rotation error in degrees in the X-axis for an exposure error at 24 cycles per millimeter. The graphs 710 and 750 illustrate a horizontal orientation and the graphs 720 and 760 illustrate a vertical orientation. Further, the graphs 710 and 720 illustrate an even number of rows within the geometry and the graphs 750 and 760 show an odd number of rows within the geometry. The graphs 710, 720, and 750 generally show a V-shaped exposure error that increases linearly from 0 to 300 exposure units from both 0° to −0.5° and 0° to +0.5°. The graph 760, however, shows no significant exposure error regardless of rotation error value. Accordingly, the use of a vertical orientation with an odd number of rows provides the greatest error compensation for a broad spectrum of rotation error percentage.

Figure 8:
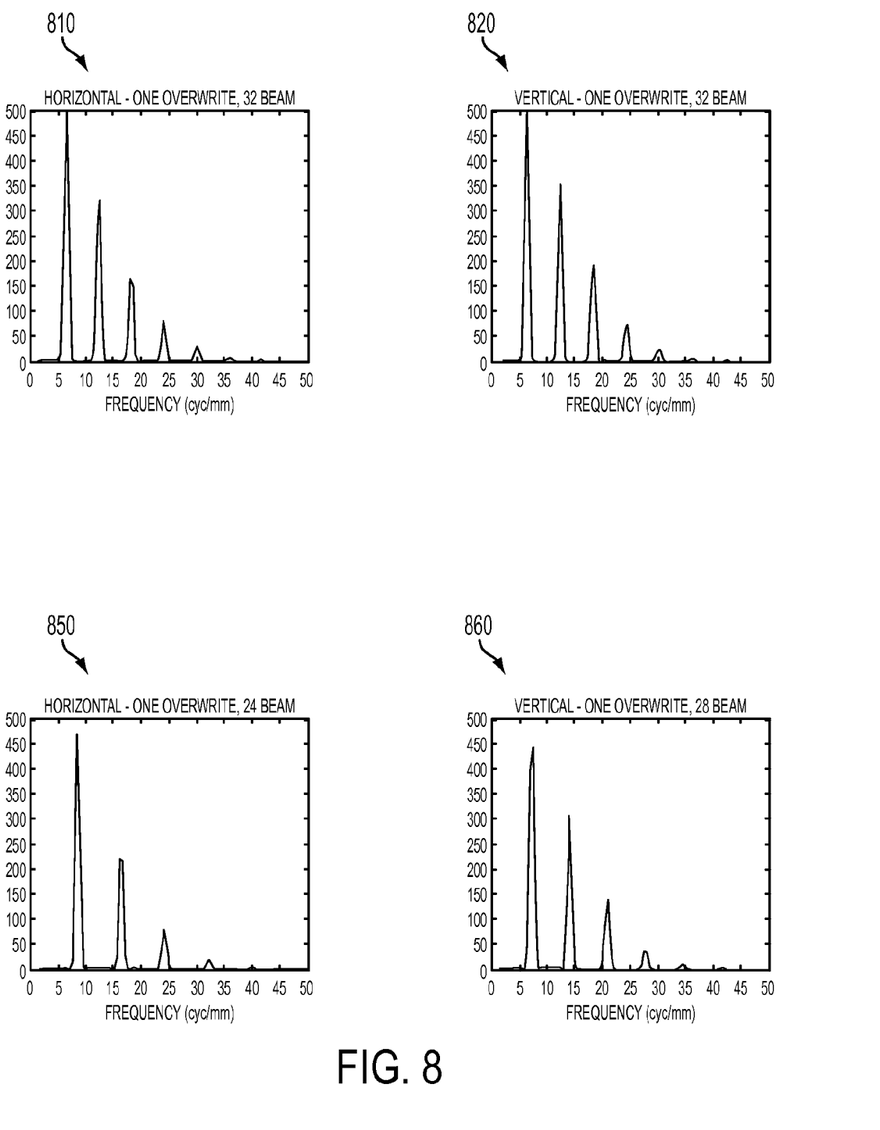
FIG. 8 illustrates graphs that show frequency spectra components for a 1.23% magnification error within an imaging system, in accordance with an exemplary embodiment.

FIG. 8 illustrates four graphs 810, 820, 850 and 860 that show frequency spectra components for a 1.23% magnification error within an imaging system. The Y-axis of each graph is in exposure units and the X-axis shows spatial frequency in cycles per millimeter. The graphs 810 and 850 illustrate a horizontal orientation and the graphs 820 and 860 illustrate a vertical orientation. Further, the graphs 810 and 820 illustrate an even number of rows within the geometry and the graphs 850 and 860 show an odd number of rows within the geometry.

The graph 810 shows six components at various amplitudes that correspond to six discrete frequencies at approximately 6 cycles per millimeter, 12 cycles per millimeter, 18 cycles per millimeter, 24 cycles per millimeter, 30 cycles per millimeter, and approximately 36 cycles per millimeter. The graph 820 shows a similar result with components at approximately the same locations with approximately the same amplitude. The graph 850, however, shows a significant reduction in the number of components within the frequency spectra with only four components at approximately 8 cycles per millimeter, 16 cycles per millimeter, 24 cycles per millimeter, and 32 cycles per millimeter. The graph 860 shows a similar result as the graph 850 with four components and approximately the same location and amplitude. Thus, utilizing an odd number of rows, regardless of rectangle orientation geometry, provides a significant reduction in error over light emitter arrays with an even number of rows with a 1.23% magnification error.

Figure 9:
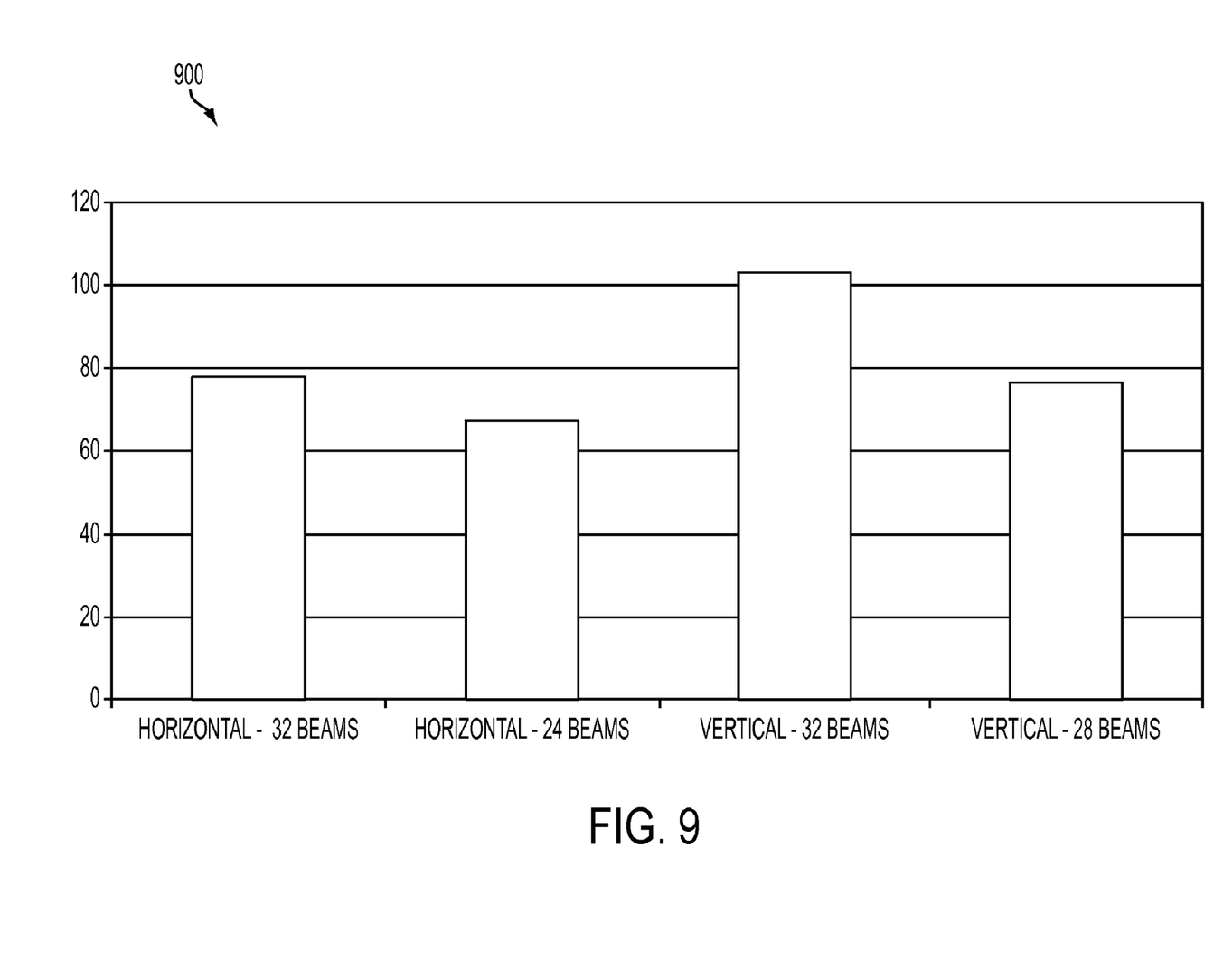
FIG. 9 illustrates a graph that shows the amplitude of fundamental frequency for a random beam-to-beam power of 1% averaged over ten realizations, in accordance with an exemplary embodiment.

FIG. 9 illustrates a graph 900 that shows the amplitude of fundamental spatial frequency of exposure for a random beam-to-beam power of 1% averaged over ten realizations. The horizontal orientation shows approximately 78 exposure units when utilizing a standard emitter geometry. This amplitude is reduced to approximately 68 exposure units when a 24 beam emitter geometry having an odd number of rows at a horizontal orientation. Similarly, the vertical orientation is 104 exposure units with a conventional geometry and reduced to 78 exposure units utilizing the exemplary embodiment with 28 beams in an odd number of rows. Accordingly, the subject embodiments do not exacerbate the non-uniformity and actually shows a slightly lower amplitude.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. An optical scanning device that projects an image onto a photoreceptor within a print system via overwriting, comprising:
    a laser light source that generates a plurality of light beam outputs, the light beam outputs are arranged in a two-dimensional parallelogram array within a substantially horizontal axis and a substantially vertical axis that is perpendicular to the horizontal axis, the two-dimensional parallelogram array has an odd number of rows of light beam outputs, wherein each row has an equal even number of light beam outputs;
    a rotating polygon mirror including a plurality of deflecting surfaces, each of the deflecting surfaces deflects the light beams emitted from the laser light source, wherein the light beam output array projects a first swath N onto the photoreceptor via the rotating mirror and swaths [N+1, N+2, . . . ] are each subsequently placed at a level one-half down the number of light beam outputs of the previous swath at an anchor point, each swath has the identical number of light emitting outputs as the two-dimensional array.

2. The optical scanning device of claim 1, wherein each light beam output is emitted via a vertical-cavity surface-emitting laser.

3. The optical scanning device of claim 1, the two-dimensional parallelogram array has a vertical orientation, wherein the number of rows is greater than the number of light beam outputs per row.

4. The optical scanning device of claim 1, the two-dimensional parallelogram array has a horizontal orientation, wherein the number of rows is less than or equal to the number of light beam outputs per row.

5. The optical scanning device of claim 1, wherein each light beam output within a row is equally spaced along the horizontal axis.

6. The optical scanning device of claim 5, wherein each light beam output within a row is equally spaced in a descending location relative to the vertical axis.

7. The optical scanning device of claim 6, wherein the descending location of each light beam output is relative to the light beam output to the immediate left within the same row.

8. The optical scanning device of claim 1, wherein row-to-row spacing error due to emitter rotation is displaced from the swath N in the subsequently placed swaths [N+1, N+2, . . . ].

9. The optical scanning device of claim 8, wherein the spacing error from one swath is at or near the center of a row for a subsequent swath.

10. An optical scanning device that projects an image onto a photoreceptor within a print system, comprising:
    a laser light source that generates a plurality of light beam outputs, the light beam outputs are arranged in a two-dimensional parallelogram array within a substantially horizontal axis and a substantially vertical axis that is perpendicular to the horizontal axis, the two-dimensional parallelogram array has an odd number of rows of light beam outputs, wherein each row has an equal even number of light beam outputs;
    a rotating polygon mirror including a plurality of deflecting surfaces, each of the deflecting surfaces deflects the light beams emitted from the laser light source, wherein the light beam output array projects a first swath N onto the photoreceptor via the rotating mirror and swaths [N+1, N+2, . . . ] are each subsequently placed at a level one-half down the number of light beam outputs of the previous swath at an anchor point, wherein a seam is created when one swath is placed on another, row-to-row spacing error is not coincident with swath-to-swath seam error.

11. The optical scanning device of claim 10, wherein each swath has the identical number of light emitting outputs as the two-dimensional parallelogram array.

12. The optical scanning device of claim 10, wherein each light beam output is emitted via a vertical-cavity surface-emitting laser.

13. The optical scanning device of claim 10, the two-dimensional parallelogram array has a vertical orientation, wherein the number of rows is greater than the number of light beam outputs per row.

14. The optical scanning device of claim 10, the two-dimensional parallelogram array has a horizontal orientation, wherein the number of rows is less than or equal to the number of light beam outputs per row.

15. The optical scanning device of claim 10, wherein each light beam output within a row is equally spaced along the horizontal axis.

16. The optical scanning device of claim 15, wherein the descending location of each light beam output is relative to the light beam output to the immediate left within the same row.

17. The optical scanning device of claim 10, wherein relative to the vertical axis, the distance between each row of light emitting outputs is equal to the distance of each light emitting output within the same row.

18. An optical scanning device that projects an image onto a photoreceptor within a print system, comprising:
  a laser light source that generates a plurality of light beam outputs, the light beam outputs are arranged in a two-dimensional parallelogram array within a substantially horizontal axis and a substantially vertical axis that is perpendicular to the horizontal axis, the two-dimensional parallelogram array has an odd number of rows of light beam outputs, wherein each row has an equal even number of light beam outputs;
  a rotating polygon mirror including a plurality of deflecting surfaces, each of the deflecting surfaces deflects the light beams emitted from the laser light source, wherein the light beam output array projects a first swath N onto the photoreceptor via the rotating mirror and swaths [N+1, N+2, . . . ] are each subsequently placed at a level one-half down the number of light beam outputs of the previous swath at an anchor point, row-to-row spacing error due to emitter rotation error is displaced in successive swaths, wherein the displacement is located such that the spacing error from one swath is at or near the center of a row of a subsequent swath.

19. The optical scanning device of claim 18, wherein each light beam output within a row is equally spaced in a descending location relative to the vertical axis, the descending location of each light beam output is relative to the light beam output to the immediate left within the same row.

20. The optical scanning device of claim 19, wherein relative to the vertical axis, the distance between each row of light emitting outputs is equal to the distance of each light emitting output within the same row.

* * * * *